United States Patent [19]

Dominguez-Burguette

[11] 3,876,724

[45] Apr. 8, 1975

[54] SEMICONDUCTIVE FRICTION ELEMENT
[75] Inventor: Mario Dominguez-Burguette, Lake Elmo Village, Minn.
[73] Assignee: Minnesota Mining and Manufacturing Company, St. Paul, Minn.
[22] Filed: Dec. 26, 1972
[21] Appl. No.: 318,006

Related U.S. Application Data
[62] Division of Ser. No. 47,861, June 19, 1970, Pat. No. 3,721,649.

[52] U.S. Cl............... 260/838; 260/47 C; 260/843; 260/DIG. 39
[51] Int. Cl...................... C08g 15/00; C08g 37/16
[58] Field of Search.................. 260/838, 843, 47 C

[56] References Cited
UNITED STATES PATENTS

| | | | |
|---|---|---|---|
| 2,035,578 | 3/1936 | Wagner | 260/47 C |
| 2,437,232 | 3/1948 | Rothrock et al. | 260/75 R |
| 3,067,169 | 12/1962 | Krimm et al. | 260/46.5 |
| 3,349,302 | 10/1967 | Pohl | 317/258 |
| 3,469,441 | 9/1969 | Pohl | 73/88.5 |

Primary Examiner—John C. Bleutge
Attorney, Agent, or Firm—Alexander, Sell, Steldt and DeLaHunt

[57] ABSTRACT

A semiconductive phthalein-fluoran polymer adapted for use in a friction element in an electrostatic device of the Johnsen-Rahbek type. The semiconductor polymer is produced by a Friedel-Crafts type condensation reaction, e.g. of a hydroxyanthraquinone or a hydroxynapthalene with phthalic anhydride, 1,8-napthalic anhydride, or 3,4,5,6-tetrahydrophthalic anhydride at a reaction temperature in the range of from 259 to 268°C.

1 Claim, No Drawings

SEMICONDUCTIVE FRICTION ELEMENT

This is a division of Ser. No. 47,861, filed June 19, 1970 now U.S. Pat. No. 3,721,649.

The present invention relates to materials having semiconductive electronic properties, and more particularly to semiconductive organic polymers having physical and chemical properties which make them useful in an electrostatic friction device utilizing the Johnsen-Rahbek effect.

The Johnsen-Rahbek effect involves the production of an electrostatic attraction, known as the Johnsen-Rahbek force, between a surface of an electrically conducting member and a closely adjacent surface of a semiconductive member, under the application of sufficient voltage between the members. The surfaces of the members are positioned in close slipping contact so that the Johnsen-Rahbek force produced between them when the proper voltage is applied is capable of increasing the frictional force between the surfaces. An electrostatic clutch is provided when both members are enageably mounted. This type of clutch is well known; for a specific example see U.S. Pat. No. 3,343,636.

The efficacy of the semiconductive material as might be expected plays a key role in the operation of the electrostatic friction device. Natural semiconductive materials, such as limestone which obtains its semiconductive properties from the presence of moisture therein, found use in early electrostatic friction devices but give variable results. Certain ceramic semiconductors are known to possess the proper semiconductive requirements for the electrostatic device but they exhibit poor frictional properties. Partically pyrolyzed cellulose carbon semiconductors, depending upon polyradical sites formed during pyrolysis, have been used in electrostatic clutches. However, they are seen to lose efficiency during operation.

Semiconductors, as presently regarded, are materials which have electrical resistivity characteristics somewhere between those of insulator and metals, i.e. a resistivity value between about $10^2$ and $10^{10}$ ohm-cm. at normal temperatures Organic semiconductors have been known for some time although their utility has not been fully realized. The organic semiconductors of the present invention are of the semiconductive organic polymer type rather than the well-characterized molecular crystal type. Semiconductive organic polymers are not well characterized, partly due to the difficulty in establishing their physical-chemical structures.

Semiconductors for use in Johnsen-Rahbek devices must have certain required electrical properties to insure trouble-free long-term operation. Generally, the resistivity of the semiconductor must remain within the range of $10^7$ to $10^9$ ohm-cm. under use conditions before the Johnsen-Rahbek effect can be produced. Additionally, the resistivity must be maintained in this range for the operational life of the device; increases or decreases in resistivity out of the specified range cannot be tolerated.

Specifically, the semiconductor of the present invention is an organic polymer of the phthalein-fluoran type (hereinafter referred to as the P-F type). It can be reproducibly prepared to have electronic resistivity in the desired range of from $10^7$ to $10^9$ ohm-cm. Furthermore, the resistivity remains in the desired range even after operation in atmospheric oxygen.

The P-F type semiconductive polymer of the present invention is produced in the condensation reaction of a hydroxyanthraquinone or hydroxynaphthalene with phthalic anhydride, 1,8-naphthalic anhydride or 3,4,5,6-tetrahydrophthalic anhydride. The condensation is accomplished in the presence of a catalytic amount of zinc chloride while heating at a temperature in the range of from 259 to 268°C. for a time sufficient to permit the formation of a polymer. The condensation is of the well-known Freidel-Crafts type with reaction times up to 24 hours or more.

Semiconductive organic polymers of the so-called PAQR or polyacene quinone radical type have been produced in condensation reactions of similar components at 250°C. and at 306°C.; see "Studies of some Semiconducting Polymers", Chapter in "Organic Semiconductors", edited by Brophy and Buttrey, McMillan, 1962, page 143 and U.S. Pat. No. 3,349,302. PAQR polymers attain their name by their mode of synthesis and from their radical content. Unlike the P-F polymers of the present invention the PAQR polymers have been observed to have high concentrations of free radicals, and are, therefore, polyradicals. The PAQR semiconductive organic polymers show little utility for use in electrostatic devices such as the Johnsen-Rahbek clutch. This is due to their inability to provide the proper resistivity and also to maintain a stable and uniform resistivity under the use conditions herein specified for such devices.

The organic semiconductive polymer of the present invention is a linear polymer having repeating phthalein and floran type structures.

The term "phthalein" as herein used refers to a bishydroxyaryl lactide characterized by having a substituted gamma-lactide linking group which connects the hydroxyl-aryl groups at a position vicinal to the hydroxyl group. The substituted gamma-lactide can be phthalolactide, 3,4,5,6-tetrahydrophthalolactide, or naphthalactide.

The term "fluoran" as herein used refers to an unsaturated 6 member hydrocarbon ring having an oxygen heteroatom and a lactide group attached at the "four" position of the ring. The fluoran type structure may be derived from a phthalein type structure by the condensation cyclization of the hydroxyls of the bishydroxyaryl groups to an ether linkage by elimination of a water molecule.

The general arrangement of the polymer may be represented by the exemplary condensation reaction product of 1,5-dihydroxyanthraquinone (I) and phthalic anhydride (II) according to the method herein described.

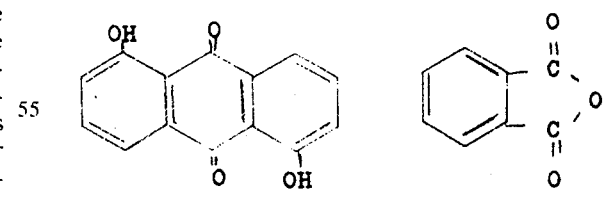

I          II

The condensation product (III) is a linear polymer consisting of repeating hydroxyanthraquinone groups linked at beta positions vicinal to the alpha hydroxyl groups of the anthraquinone by substituted gamma-lactide, e.g. phthalolactide (as shown), linking groups in phthalein (IV) and fluoran (V) type structures.

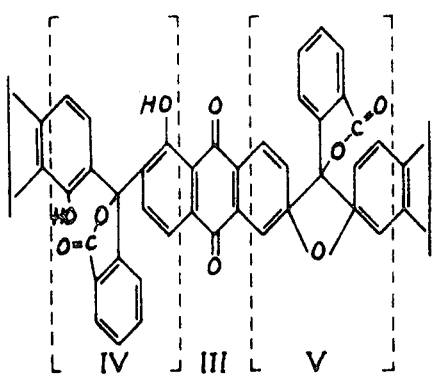

The phthalein type structure (IV) may exist in various resonance forms, providing a highly electrically conductive associated lactone arrangement to the polymer. The extreme resonance forms of the phthalein type structure (IV) may be represented by resonance forms (IVa) and (IVb). The fluoran type (V) structure provides a moderate level of electrical conductivity to the molecule, much weaker than of the associated lactone arrangement of the phthalein type structure (IV).

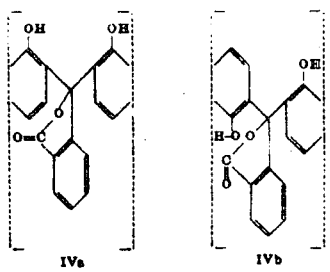

The existence of the above mentioned structures in the polymer is thought to be random rather than ordered, i.e. there probably is no repeating sequence of structures. Polymers prepared according to the method of the present invention will contain one phthalein type structure for each five to seven fluoran type structures.

The fluoran type (V) structure will be favored at the specified reaction temperature because of the tendency of the phthalein type structures (IVa) to cyclize by dehydration to the fluoran type form (V) at temperatures in excess of 180°C. This is particularly true with dihydroxyaromatic compounds which provide a greater number of hydroxyl groups, thus more opportunities for cyclization. The polymer, therefore, is characterized by having mainly the moderately conductive fluoran type structure (V) with minor portions of phthalein type structures.

Confirmation of the phthalein and fluoran structures has been obtained through the use of a procedure of functional group analysis disclosed by Hofmann and Ohlerich, Augew. Chem. 62:16 (1950) and Geissman, Weiss and Willis, Aust. J. Chem. 10:295 (1957).

Temperature plays a key role in the formation of the polymer of the present invention. Polymers of the disclosed components prepared at a temperature below the specified reaction temperature range of 259–268°C. have a plastic or an unctuous character and cause smearing of the clutch surface. At formation temperatures in excess of 268°C. decarboxylation of the lactone of the fluoran structure (V) occurs thereby forming a diradical containing structure (VI) in the polymer which is inherently sensitive to oxygen, thus giving unreliable resistivity values.

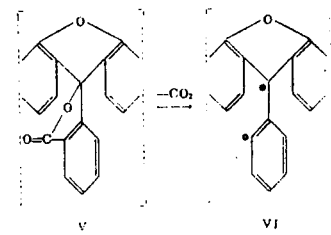

Surprisingly, the conductivity of the polymer can be controllably altered by heat treatment. Heating the polymer in the absence of oxygen between about 170° to 180°C causes further dehydration of the phthalein type structure (IV) to the more conductive fluoran type structure (V) causing permanent increased conductivity. Additionally, heating the polymer in the presence of oxygen or air at a temperature in excess of 210°C. but below 270°C. causes decarboxylation of the associated lactone linking structure of the phthalein type structure (IVb) to form a less conductive quinonoid structure (VII).

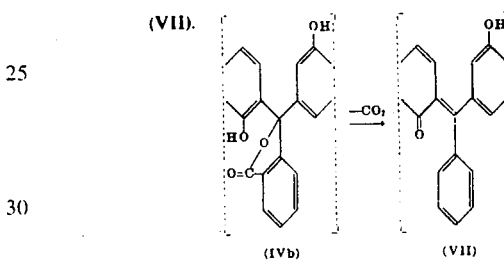

Thus, a means is provided for adapting the resistivity of P-F polymers for use in electrostatic clutch devices utilizing the Johnsen-Rahbek effect.

The resulting polymer is a powdery material with very poor binding characteristics, therefore, the use of an appropriate binder is necessary to confer the desired rigidity to the material to form a friction element for use in a clutch. Various resinous materials are suited for this purpose, but the preferred binder is of the heat-setting electrically non-conductive phenol-formaldehyde novalae phenolic resin type. When phenolic resins are rigidified with the ground polymer a friction element is provided having suitable frictional properties for use in an electrostatic device, e.g. a clutch or a brake.

A molded friction element may be prepared by uniformly mixing pulverized P-F polymer with powdered thermosetting, temporarily thermoplastic binder precursor and placing the mixture in a die. The mixture is compacted with a hydraulic press under a pressure of from 200 to 2500 kg. per sq. cm., preferably from about 1000 to 2000 kg. per sq. cm. with the application of sufficient heat to cause the binder to flow and then to heat cure.

The friction element may contain from about 80 to 97 weight percent P-F polymer with the remainder being binder. Preferably, the friction element contains about 94 to 95 weight percent P-F polymer and from 6 to 5 weight percent phenolic resin binder.

Generally prolonged periods of slipping cause a slight wearing away of the surface of the semiconductive material in the friction element. Heretofore this wearing has produced dust particles which adhere to the contacting surfaces accelerating wearing of the semiconductive surface and shortening the useful life of the clutch. Wiping devices have proven inadequate because they are soon saturated with dust and then they become abrasive members as well as ceasing to function. The present material provides a unique combination in a friction element which wears during operation without the adverse production of dust of particles. Heat is produced by electrical discharge at microscopic point contacts on the semiconductive surface of the friction element which contacts similar points on the conductor surface to immediately decompose the small semiconductive peaks to gaseous products. Dust particles may be produced but these are surprisingly nonadherent to the contacting surfaces and are ejected by the movement of the contacting surfaces.

The aforementioned hydroxyaromatic compound may be an alpha-hydroxyanthraquinone or alpha-hydroxynaphthalene. Specifically useful hydroxyaromatic compounds include 1-hydroxyanthraquinone, 1,5-dihydroxyanthraquinone, 1,8-dihydroxyanthraquinone, 1-hydroxynaphthalene, 1,8-dihydroxynaphthalene, and 1,5-dihydroxynaphthalene. The abovementioned hydroxyaromatic compounds are characterized by having at least one hydroxyl group in the "one" or alpha position and, possibly, a second hydroxyl group in either the "five" or "eight" alpha position of the molecule. The presence of a hydroxyl group in the alpha position activates a vicinal beta position providing a reaction site for the condensation reaction.

The acid anhydride may be phthalic anhydride, 1,8-naphthalic anhydride or 3,4,5,6-tetrahydrophthalic anhydride. Also useful are the acid precursors to these anhydrides which dehydrate at the specified reaction temperatures to form their respective anhydrides.

The condensation reaction is carried out under substantially anhydrous conditions in a reaction vessel in the presence of a catalytic amount of zinc chloride. For convenience of handling and efficiency of reaction the ingredients may be pulverized prior to placement in the reaction vessel. Additionally, the powdered ingredients may be dispersed into a high boiling (boiling above 270°C.) inert liquid such as perfluoro-1,6-dicyclohexylhexane, providing a support medium and a means of uniformly heating the reactants.

The ingredients, i.e. the hydroxyaromatic compound, the acid anhydride, and the zinc chloride, are mixed together with the inert liquid in a suitable open reaction vessel in a preferred molar ratio of about 1:1:2, respectively. Up to a 15 weight percent excess of the acid anhydride may be added. The zinc chloride is added to a level of at least 2 moles. Preferably, from about 2 to 3 moles of zinc cloride is used. The preferred ratio of inert liquid to solids is about 2.5 ml. per gram of reactants, i.e. of the mixture of hydroxyaromatic compound and acid anhydride.

The mixture of ingredients is heated to a temperature within the range of 259 to 268°C. until sufficient polymerization of the reactants is achieved. Preferably, the reaction is continued until less than 10 weight percent of the hydroxyaromatic compound remains unreacted. Reaction time may vary according to the quantity of material reacted, i.e. longer reaction time may be required for larger batches of reactants. Generally, for a 100 gram reaction, i.e. 100 grams consisting of the hydroxyaromatic compound, the acid anhydride and zinc chloride catalyst, a reaction time of 24 hours is sufficient to produce an adequate yield of semiconductive polymer.

Upon completion of the condensation reaction to the desired degree, the mixture is decanted to remove the inert liquid from the solid reaction product. Purification is accomplished by grinding the reaction product and heat expressing the ground material at 150°C. to expel essentially all of the inert liquid. The ground material is then boiled in a 1N hydrochloric acid solution and extracted with deionized water until the extraction liquid fails to give a positive test for zinc with a dithizone test. Additionally, the extraction with water is continued until the extraction solution is free of chloride ion detectible with a silver nitrate test. The solid material is thereafter extracted with acetone until the extraction solution is colorless and does not give a precipitate upon the addition of dilute hydrochloric acid, indicating removal of all but trace amounts of the hydroxyaromatic compound. Thereafter the solid product is dried in a hot air current at a temperature in the range of about 100°C. to about 120°C. The product, after the abovementioned purification steps, is a black, hard, and infusible solid which is insoluble in water and organic liquids.

The specific resistivity of the P-F polymers prepared according to the present invention was determined by measuring the bulk resistance of one gram of powdered (about 125mmicron particle size) polymer in a nonconductive cell, e.g., a pyrex tube. The powder was uniformly compacted under a force of 4 kg. per sq. cm. applied by supporting the cell on a lower aluminum plunger sufficient weight on an upper aluminum plunger to produce a force of 4 kgm. per sq. cm. on the sample. The bulk resistance of the compacted material between the aluminum plungers was measured at about 25°C. and relative humidity of about 55 percent. The specific resistance was then obtained by multiplying the cell area by the measured bulk resistance and dividing by the sample thickness.

Examples

| Ex. No. | Hydroxyaromatic Compound | Acid Anhydride | Specific (ohm-cm.) Resistance |
| --- | --- | --- | --- |
| 1 | 1,5-dihydroxynaphthalene | THPA[1] | $2.6 \times 10^8$ |
| 2 | 1,5-dihydroxynaphthalene | PA[2] | $7.1 \times 10^7$ |
| 3 | 1 hydroxynaphthalene | THPA | $6.7 \times 10^8$ |
| 4 | 1 hydroxynaphthalene | PA | $9.8 \times 10^8$ |
| 5 | 1 hydroxyanthraquinone | THPA | $4.5 \times 10^8$ |
| 6 | 1 hydroxyanthraquinone | PA | $1.9 \times 10^8$ |
| 7 | 1 hydroxyanthraquinone | NA[3] | $7.7 \times 10^8$ |
| 8 | 1,5-dihydroxyanthraquinone | THPA | $3.2 \times 10^8$ |
| 9 | 1,5-dihydroxyanthraquinone | PA | $9.2 \times 10^7$ |
| 10 | 1,5-dihydroxyanthraquinone | NA | $8.2 \times 10^8$ |
| 11 | 1,8-dihydroxyanthraquinone | THPA | $4.7 \times 10^8$ |
| 12 | 1,8-dihydroxyanthraquinone | PA | $3.6 \times 10^8$ |
| 13 | 1,8-dihydroxyanthraquinone | NA | $2.1 \times 10^8$ |

[1]3,4,5,6-tetrahydrophthalic anhydride
[2]Phthalic anhydride
[3]1,8-naphthalic anhydride For each of the examples about 1.0 mole of the hydroxyaromatic compound, 0.5 mole of the acid anhydride, and 2.5 moles of anhydrous zinc chloride were uniformly mixed with a mortar and pestle and placed into a glass reaction vessel containing 2.5 ml. of the inert liquid per gram of reactant. The vessel was heated to about 200°C. for about 15–18 hours which resulted in a homogenous melt of the reactants. Thereafter, the contents of the vessel were cooled to 180°C. and an additional 0.6 mole of the acid anhydride was added to and uniformly mixed with the reactants. The contents of the vessel were then heated to 262°C. and heating at that temperature was continued for about 30 to 35 hours. A solidification of the reactant melt and clarification of the inert carrier liquid indicated completion of the polymerization reaction.

The material was purified and dried in the manner as hereinbefore described. The dried material was ground to a particle size of about 125 microns and the specific resistivity was thereafter measured according to the method hereinbefore disclosed.

The specific resistivity was adjusted to fall within the range of 2.0 to $3.5 \times 10^8$ ohm-cm. by heating the powdered material at a temperature between 170–180°C. to lower the resistivity or heating above 210°C. to raise the resistivity.

Friction elements were prepared from each of the semiconductive materials prepared by uniformly mixing about 0.63 grams of powdered P-F polymer with 0.07 grams of powdered phenol-formaldehyde novolac phenolic resin precursor (sold under the tradename "BRP-4404" by the Union Carbide Company). This powdered mixture was placed in a 2.5 cm. diameter die which was placed into a hydraulic press and pressed at 1500 kg. per sq. cm. while heating the die at 150°C. (the initial flowing temperature of the phenolic resin material.) The temperature was raised at about 0.5°C. per minute to 157°C. to solidify the resin. The pressed disk was removed and ground to a substantially flat surface and a thickness of about 0.73 ± 0.02 mm.

Testing of the disks for adequacy of the Johnsen-Rahbek force comprised placing each disk to be tested into a brake-type testing device. Disks prepared from each of the P-F polymers shown herein as Examples 1-13 produced very strong adhesive forces, thus indicating their utility for use as Johnsen-Rahbek friction elements. Each disk was continuously tested over a period of at least 2 weeks with substantially uniform results. Additionally, during the entire prolonged testing period neither the adverse accumulation of dust particles nor the smearing of the disk surface were noted.

What is claimed is:

1. A friction element adapted for use in an electrostatic apparatus of the type utilizing the Johnsen-Rahbek effect and comprising from about 3 to 20 weight percent phenol-formaldehyde phenolic resin heat-set and correspondingly from 97 to 80 weight percent of an organic semiconductive material prepared by heating while maintaining substantially anhydrous conditions (1) a hydroxy aromatic compound selected from the group consisting of alpha-hydroxyanthraquinones and alpha-hydroxy-naphthalenes and (2) an acid anhydride selected from the group consisting of phthalic anhydride, 1,8-naphthalic anhydride and 3,4,5,6-tetrahydrophthalic anhydride in a molar ratio of about 1:1 with up to 15 weight percent excess of the acid anhydride in the presence of a catalytic amount of zinc chloride, at a temperature in the range 259° to 268°C., and for a time sufficient to cause condensation to a hard, insoluble polymer.

* * * * *